United States Patent [19]

Noorlander et al.

[11] Patent Number: 4,582,022
[45] Date of Patent: Apr. 15, 1986

[54] MILK COLLECTING SYSTEM FOR AUTOMATIC MILK APPARATUS

[76] Inventors: Daniel O. Noorlander, 508 W. 630 South, Orem, Utah 84057; Daryl W. Hennick, 7005 S. 650 West, Hyrum, Utah 84319

[21] Appl. No.: 631,213

[22] Filed: Jul. 16, 1984

Related U.S. Application Data

[63] Continuation-in-part of Ser. No. 374,518, May 3, 1982, Pat. No. 4,459,940.

[51] Int. Cl.4 ................................................. A01J 7/00
[52] U.S. Cl. .............................. 119/14.54; 119/14.55; 119/14.32
[58] Field of Search ............... 119/14.54, 14.55, 14.32, 119/14.36; 114/14.47, 14.49, 14.54, 14.55

[56] References Cited

U.S. PATENT DOCUMENTS

| | | | |
|---|---|---|---|
| 3,077,180 | 2/1963 | Hagg et al. | 119/14.36 X |
| 3,373,761 | 3/1968 | Flocchini | 119/14.08 X |
| 4,315,480 | 2/1982 | Noorlander | 119/14.49 |
| 4,344,385 | 8/1982 | Swanson et al. | 119/14.08 |
| 4,452,177 | 6/1984 | Plett | 119/14.32 |
| 4,459,940 | 7/1984 | Noorlander | 119/14.54 |

Primary Examiner—Hugh R. Chamblee
Attorney, Agent, or Firm—Terry M. Crellin

[57] ABSTRACT

A collector member for the vacuum hose lines and pulsator lines from the milking cups of an automatic milking machine is provided which permits connection of the vacuum hose lines to a milk line or milk pail such that milk never contacts any part of the collector member itself. The collector is advantageously used in a system in which the vacuum hose lines for the milking cups are attached to a multi-lumen milk hose with each hose line being connected to a respective lumen in the multi-lumen milk hose. The collector member is sufficiently weighted so as to provide desirable tension to the teats of the animal being milked.

10 Claims, 16 Drawing Figures

MILK COLLECTING SYSTEM FOR AUTOMATIC MILK APPARATUS

RELATED APPLICATION

This application is a continuation-in-part of application Ser. No. 374,518, filed 5-3-82, now U.S. Pat. No. 4,459,940. The entire contents of application Ser. No. 374,518 are incorporated herein by reference.

BACKGROUND OF THE INVENTION

1. Field

The invention relates in general to a system for collecting milk from the teats of the animal being milked and transporting the milk through separate hose lines to a common milk line or pail. More particularly, the invention relates to a system employing hose lines made of silicone rubber and a novel collector member which brings the hose lines together. A teat cup employing a built in valving means is also provided for closing individual hose lines when a teat cup and its respective hose line fall from a teat of the animal being milked.

2. State of the Art

The construction and design of automatic milking apparatus has been recognized as a very important consideration in the dairy industry. Bacterial contamination of the milking machines contributes directly to mastitis, and much effort has been made in hygienic precautionary measures as well as in the design and construction of the milking apparatus.

Research has recently shown that potential habitats for bacteria not only include such areas as the underside of milk tube ferrules, rubber gaskets and other cracks and crevices between parts in conventional claws used in milking machines, but also include microhabitats created by microscopic surface cracks which exist in the rubber tubing and inflations used in the milking machines. The surface cracks of conventional rubber parts become more severe with usage. The use of silicone rubber inflations in automatic milking machines has recently become feasible. The use of silicone rubber for milk hose lines as well as for inflations is highly desirable, inasmuch as silicone rubber parts do not exhibit surface cracks as experienced with conventional rubber parts, and the potential habitats for bacterial propagation are greatly minimized. Silicone rubber parts do not exhibit surface cracks over their entire lifespan. Unfortunately, use of silicone rubber for the vacuum hose lines of the milking cups has not been feasible because the ferrules on the claws of the milking apparatus readily cut through the silicone rubber which is inherently susceptible to puncture and tear damage especially in areas where the silicone rubber is stressed.

It has been found that silicone rubber hose lines can be connected directly between the nipples on the milking cups and the milk pipe or pail. However, such a system is not practical. The separate hose lines required separate vacuum shut-off means as well as means to close off all vacuum hose lines simultaneously. The separate hose lines are cumbersome and subject to getting entangled and damaged, and a system of identifying corresponding hose lines and milking cups is needed to facilitate practical application of the milking cups to the animal being milked.

Even when fastidious hygienic procedures are followed to minimize bacterial contamination, mastitis is still a problem. It has been found that unstable vacuum variations occur within the milking cups of automatic milking apparatus. The unstable vacuum conditions can cause bacteria laden milk to flow backward in the vacuum hose lines. Under certain conditions, such as when one of the teats which are being milked has reached the end point of milking, milk can be forced backward into the teat by pressure differentials across the teat opening. This problem was discussed in U.S. Pat. No. 4,253,420, and, as explained therein, one way which has been tried to avoid the undesirable pressure variations and the return flow of milk contacting the tip of the teat is to provide an enlarged volume in the collecting piece. A quarter milking machine and a collecting piece for valving the four vacuum hoses from the milking cups are proposed in U.S. Pat. No. 4,253,420, wherein the collecting piece comprises metal rotating parts having alignment ports therein and ferrules for connection of the vacuum hoses thereto. The rotatable parts must be closely machined to maintain proper seal. Milk contacts the metal ferrules and parts in the collecting piece, and the cracks and crevices are present to form a habitat for bacteria. Further, vacuum hose lines of silicone cannot be used with the collecting piece inasmuch as the ferrules puncture the silicone rubber material.

3. Objectives

A principal objective of the present invention is to provide a practical milking system which reduces the cyclic vacuum variations at the ends of the teats of the animal being milked and which otherwise occur due to opening and closing of the inflations of the other milking cups and by one or more milking cups falling from the teat of the animal.

A particular objective of the invention is to provide a system in which four separate milk channels are provided from the respective milking cups to the milk line or pail, with a novel collector member for collecting or bringing together the vacuum hose lines from the respective milking cups in closely spaced arrangement beneath the udder of the animal being milked.

A further objective of the invention is to provide a collector member which is associated with the vacuum hose lines from the milking cups so that the weight of the collector member is supported through the vacuum hoses and the milking cups by the teats of the animal being milked, but wherein the collector member has no milk contacting surfaces.

A further objective of the invention is to provide a collecting member which permits the use of silicone rubber vacuum hose lines and protects the hose lines from damage.

An additional objective of the invention is to provide a collector member which has no ferrules to puncture and harm silicone rubber tubing used as vacuum hose lines from the milking cups.

An additional objective of the invention is to provide a collecting member which has means for simultaneously closing off the vacuum in all the vacuum hose lines to the milking cups.

A still further objective of the invention is to provide a milking system in which sanitation is promoted by using silicone rubber vacuum hoses which are very easily cleaned and which do not have surface cracks and irregularities to provide a habitat for bacteria.

A further objective of the invention is to provide a novel teat cup in combination with the novel collecting member wherein the teat cup has built thereinto a unique valving means adapted to closing the vacuum hose line attached to the teat cup whenever the teat cup falls from a teat of the animal being milked.

SUMMARY OF THE INVENTION

The above objectives are achieved in accordance with the present invention by a novel system in which the milk from the individual milking cups is collected by individual vacuum hose lines preferably made of silicone rubber. The vacuum hose lines are collected or brought together beneath the udder of the animal being milked by a novel collector member. The collector member is associated with the vacuum hose lines so that the weight of the collector member is supported by the teats of the animal being milked by way of the vacuum hose lines and the milk or teat cups attached to the teats of the animal. The weight of the collector is sufficient to provide the desirable, downward tension in the teats of the animal which enhances the withdrawal of milk from the teats.

The collector member has no milk contacting surfaces and, thus, presents no habitats particular thereto for bacterial propagation within the milk. The collector member comprises at least one passageway therein through which the vacuum hose lines pass in closely spaced relationship. Novel teat cups having built in valve means are advantageously provided in combination with the system using the novel collector member. The valving means of the novel teat cups are adapted to automatically close the vacuum hose lines attached to the respective teat cups whenever the teat cups fall from the teats of the animal being milked. Closing off the vacuum to the fallen milk cup prevents intake of large volumes of air through the fallen milk cup which otherwise causes a large fluctuation in the pressure at the ends of the teats which are still being milked. In addition, closing off the vacuum prevents dirt and other foreign matter from being taken into the milk collecting system through the fallen milk cup.

The novel collector member of the present invention does not have ferrules as are commonly used on conventional milk claws to puncture the vacuum base lines which are made of elastomeric material, preferably silicone rubber. In fact, one of the great benefits of the collector member of this invention is that it is completely compatible with vacuum hose lines made of silicone rubber.

The vacuum hose lines pass through the passageway in the collector member and there is no contact between milk in the vacuum hose lines and the collector member. The collector member advantageously further includes a releasable clamp means through which the collected vacuum hose lines also pass. The clamp means is adapted to simultaneously compress all the vacuum hose lines when the clamp means is activated and, thus, turn off the vacuum in all the vacuum hose lines in one operation.

The collector member also advantageously includes a manifold member having a plurality of nipples. One of the nipples is adapted to be connected to an air line of pulsating pressure, and the other nipples are adapted to be connected to pulsating air lines from the respective milking cups of the automatic milking machine.

As mentioned in U.S. Pat. No. 4,253,420, it has been found that unstable vacuum conditions in a common milk hose as is customarily used to deliver milk from the claw of conventional milking machines to the milk pipe or milk pail, can result in bacteria laden milk being forced backwardly into one or more teats of the animal being milked. The undesirable backup of milk in the vacuum hose lines can be substantially eliminated by maintaining separate and distinct vacuum hose lines from each milk cup to the milk line or milk pail. However, the separate hose lines require a complex vacuum shut off system which is adapted to shut off individual hose lines when necessary and to shut off all the hose lines simultaneously when desired. The separate hose lines additionally require a system of separating and identifying the individual vacuum hose lines to facilitate the practical application to the teats of the animal being milked. Further, the separate hose lines were found to be cumbersome and impractical. With the collector member of the present invention, a practical system can be provided in which separate milk channels extend from the respective milking cups to the milk pipe or pail. The collector member brings the vacuum hose lines together in closely spaced arrangement beneath the udder of the animal being milked. The separate hose lines can then be banded together at spaced intervals along the length thereof between the collector member and the milk pipe or pail. Preferably, however, a multi-lumen hose is provided between the collector member and the milk pipe or pail, with an adapter to connect the individual vacuum hoses to respective lumens in the multi-lumen hose at the collector member. The multi-lumen hose arrangement will be more fully disclosed hereinafter in the detailed description of the preferred, illustrated embodiments.

Additional objects and features of the invention will become apparent from the following detailed description, taken together with the accompanying drawings.

THE DRAWINGS

Particular embodiments of the present invention representing the best mode presently contemplated of carrying out the invention are illustrated in the accompanying drawings in which.

DETAILED DESCRIPTION OF THE ILLUSTRATED EMBODIMENTS

Figure 1:
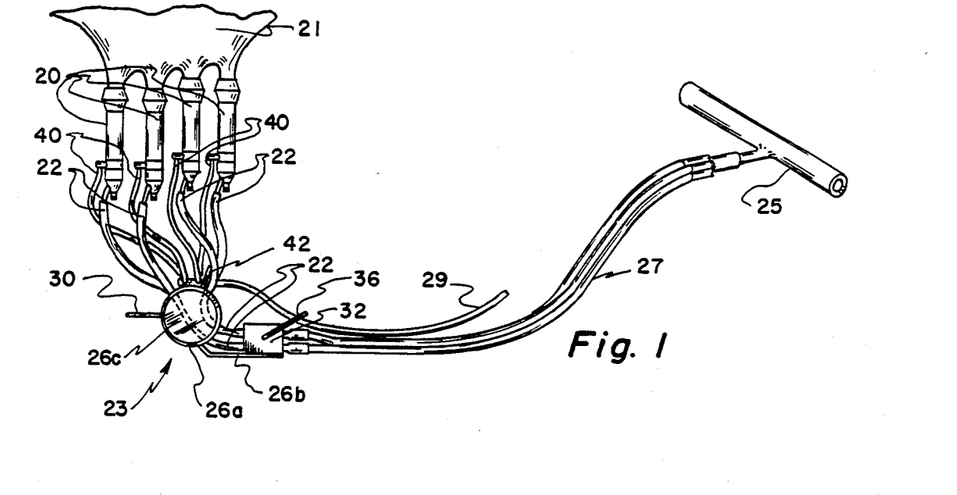
FIG. 1 is a pictorial representation of milking machine apparatus in accordance with the present invention as it is attached to the udder of a cow.

Preferred embodiments of the invention are shown in the drawings and will be described hereinafter. A general milking system which incorporates the invention is shown in FIG. 1. The teat cup assemblies 20 can be of the customary type as are well known in the art. A novel teat cup assembly in accordance with one alternate embodiment of the invention can also be used. The novel teat cup assembly will be described more fully hereinafter. In FIG. 1, the teat cup assemblies 20 are shown attached to the teats of the udder 21 of a cow. The vacuum hose lines 22 hang downwardly from the teat cups 20 and are collected or brought together in closely spaced arrangement by the novel collector member (shown in FIG. 1 by the numeral 23) of the present invention. The construction of the collector member 23 which will be described in detail hereinafter is such as to provide sufficient weight which is important in providing adequate tension in the teats of the cow to facilitate opening of the teat lumen for maximum milk outflow. Generally, a weight of from about 2 to 6 pounds is preferable. The collector member 23 preferably includes a releasable clamp means 32, which, as will be described fully hereinafter, is adapted to simultaneously compress the vacuum hose lines when the clamp means is activated and, thus, close off the vacuum in the vacuum hose lines 22 to all the teat cup assemblies 20. The assembled hose lines 22 can be periodically banded together to form a somewhat unitary, multi-line conduit 27 which extends from the collector member to the milk pail or common milk pipe 25 as shown in FIG. 1. In the preferable embodiment as will be fully disclosed hereinafter, the four vacuum hose lines are preferably connected as they emerge downstream from the collector member to a 4-lumen milk hose which extends to and is attached to the milk pail or milk pipe 25 as shown in FIG. 1. A pulsating pressure line 29 extends from the source of pulsating vacuum (not shown) to the collector 23, and as will be described hereinafter, means are provided for distributing the pulsating vacuum to the teat cup assemblies 20.

The detailed description of the novel collector member of the present invention will be made in reference to FIGS. 2-5 of the drawings. As illustrated, the collector member comprises a body member shown generally by the numeral 26 which is formed from a cylindrically shaped piece of metal plate 26a. The metal plate 26a preferably has a width of about 1½ to 3 inches and a thickness of from about 3/32 to ¼ inch. The metal plate 26a is bent to the cylindrical shape shown in the drawings so as to have substantially flat opposite ends. The ends can be open or in one preferred embodiment end plates 26c can be attached to the cylindrical member. The flat end plates 26c can be made of any suitable material, such as metal or plastic. A substantially flat base 26b is attached to the cylindrical member 26a. The flat base 26b is attached to the cylindrical member 26a near the lower longitudinal side thereof and extends away from the cylindrical member. The forward end of the flat base 26b can have an upturned portion which is attached to the cylindrical member such that the flat base 26b is displaced slightly downwardly from the lowermost portion of the cylindrical member. The length of the flat base 26b is preferably between about 5 and 10 inches or greater. The dimensions given herein for the collector member are for illustration purposes only, and the invention is not to be restricted in any way thereby.

Figure 2:
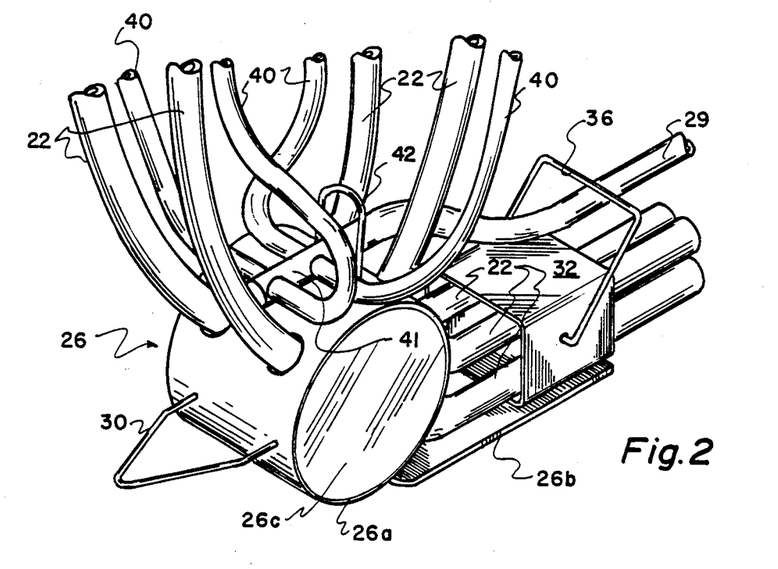
FIG. 2 is a pictorial view of the novel collector member of the present invention, showing the vacuum hose lines emerging therefrom.
Figure 3:
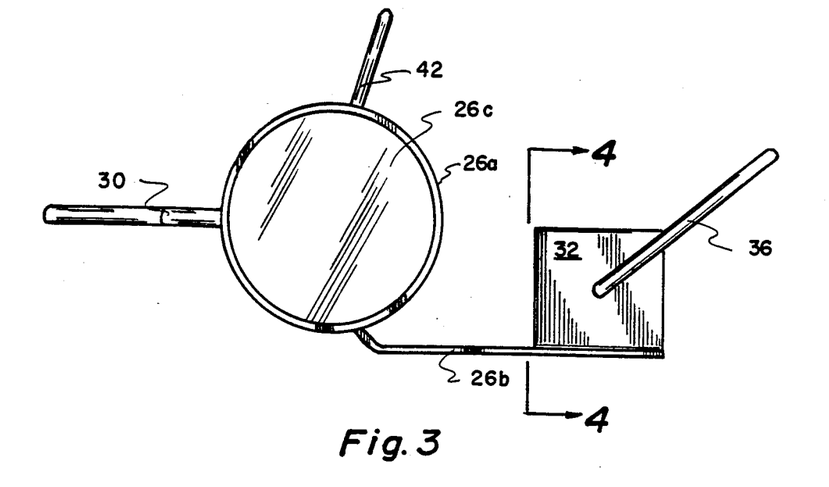
FIG. 3 is a side elevation of the collector member of FIG. 2, with the vacuum hose lines and the pulsating pressure lines omitted.

The cylindrical member 26a forms a chamber through which the vacuum hose lines 22 from the teat cups 20 pass and in which the vacuum hose lines 22 are collected or brought together in closely spaced arrangement. The cylindrical member 26a is provided with a plurality of openings in the side wall thereof through which the respective vacuum hose lines 22 enter and emerge. The vacuum hose lines 22 are thus collected together and pass through the passageway in the cylindrical member 26a. The plurality of openings allow the individual vacuum hose lines 22 to combine internally in the passageway formed by the cylindrical member 26a. The downstream openings in the cylindrical member are grouped together to form exit portals through which the downstream portions of the vacuum hose lines 22, which are collected together in common passage, exit from the common passage in closely spaced, substantially parallel alignment. The downstream portions of the vacuum hose lines 22 emerging from the cylindrical section 26a pass as a collected group along the upper surface of the flat base 26b.

A folded back rod or bar 30 can be attached to the front of the cylindrical member 26a to form a ring or loop. The ring or loop is advantageously used to hang the milking apparatus on an appropriate hanging means during storage of the apparatus when it is not being used in the milking operation.

The downstream ends of the vacuum hose lines 22 pass from the openings in the cylindrical member 26a in closely spaced, parallel arrangement, and, preferably in two sets of parallel lines, one set superimposed over the other as illustrated.

Figure 4:
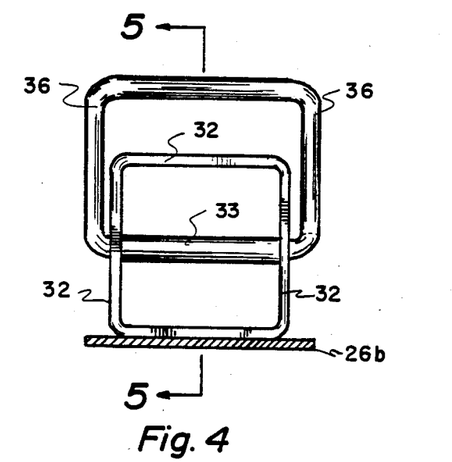
FIG. 4 is an end elevation view of the clamp means taken along line 4—4 of FIG. 3.
Figure 5:
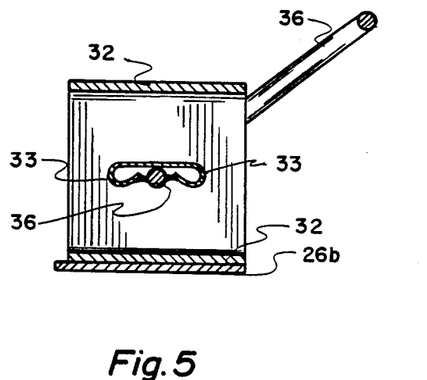
FIG. 5 is a vertical cross-sectional view through the clamp means taken along the line 5—5 of FIG. 4.
Figure 6:
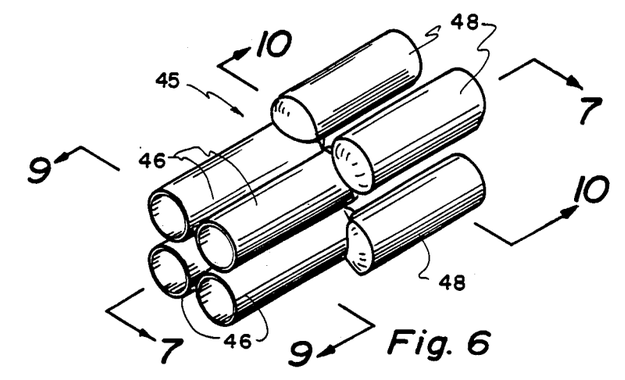
FIG. 6 is a pictorial view of the connector for attaching the vacuum hose lines at the collector member to the multi-lumen hose.
Figure 7:
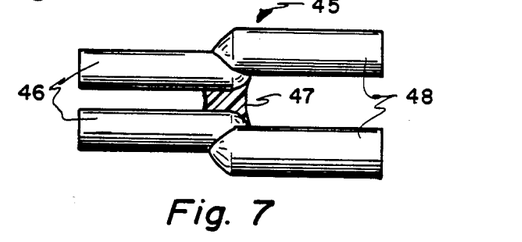
FIG. 7 is a cross-sectional view through the connector of FIG. 6 taken along line 7—7 of FIG. 6.
Figure 8:
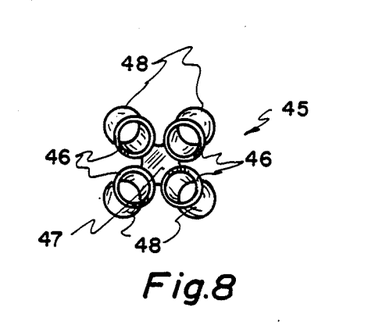
FIG. 8 is an end view of the connector of FIG. 6 looking from the left end of the connector in FIG. 6.

The collector member of the present invention is also advantageously provided with a releasable clamp means which is adapted to simultaneously compress all the vacuum hose lines 22 when the clamp means is activated. That way, the vacuum in all the vacuum hose lines 22 is turned off. As illustrated in the drawings, a clamp member 32 is mounted on the rear portion of the flat base 26 of the body member 26. The vacuum hose lines 22 downstream of the openings in the cylindrical member 26a pass through the clamp member 32. As illustrated in FIGS. 4 and 5, the clamp member 32 comprises a pair of parallel engagements 33 which are attached to a handle 36. The engagements 33 are advantageously formed by a piece of sheet metal which is folded back along opposite ends to form a smooth, rounded, elongate engagement. The piece of sheet metal is then attached along a central axis to the handle 36. As the handle 36 moves, the opposite engagements 33 press the respective hose lines 22 between the engagements 33 and the body of the clamp member 32. When the handle 36 is moved back, the engagements 33 release the hose lines 22 and the hose lines expand to their open unobstructed condition.

A manifold system is also advantageously provided with the collector members of the present invention for providing a source of pulsating vacuum from the pulsating pressure line 29 to the appropriate pulsating hoses 40 to be attached to the teat cup assemblies 20. Referring in particular to FIG. 2, a manifold member comprising an elongate tube 41 is positioned along the top of the cylindrical member 26a. A bent back rod or bar 42 is provided on the upper portion of the cylindrical member 26a, and the tube 41 is adapted to be received in and held in place by the loop formed by the rod or bar 42. One end of the tube 41 is sealed and the other open end extends through the loop formed by the rod or bar 42. The open end of the tube 41 is adapted to be connected to the pulsating pressure line 29. The end of the pulsating pressure line is slidingly connected to the open end of the tube 41.

The tube 41 has four nipples communicating therewith and extending outwardly therefrom. The nipples are adapted to be connected to the pulsating air hoses 40 from the respective teat cup assemblies of the milking machine. The tube 41 and attached nipples are advantageously molded as a unit from a rigid polymeric material.

As mentioned previously, the vacuum hose lines 22 which have been collected by the collector member can be banded together at spaced intervals so as to form a somewhat unitary conduit from the collector member to the milk pail or common milk pipe. In the preferred embodiment, as illustrated, a multi-lumen milk hose and a connector member are provided. The connector member is adapted to connect the collected, downstream ends of the vacuum hose lines adjacent to the collector member to one end of the multi-lumen milk hose, with each vacuum hose line being connected to a respective lumen in the multi-lumen milk hose. The multi-lumen hose has a minimum length of one meter, and the other end of the multi-lumen hose is adapted to be connected to a common milk pipe or to a milk pail. The minimum length of the multi-lumen milk hose has been found to be important to prevent unstable pressure variations within the individual lumens which can be caused by pulsating inflations associated with another lumen especially after one of the teats being milked has reached the end point of the milking for that teat. The minimum length of multi-lumen hose from the source of common vacuum to the collector member greatly reduces the cyclic variations in the vacuum milk hoses 22 caused by the opening and closing of inflations in the teat cup assemblies, and has been found to sufficiently stabilize the otherwise unstable vacuum conditions at the teats such as to prevent milk being backed up against a teat. The minimizing of the chances of milk being back up against a teat and forced into a teat at the end of the teat's milking has greatly reduced one cause of mastitis occurring in animals on which automatic milking machines are used.

The multi-lumen hose can be merged into a single lumen connecting hose line which is then connected to the common milk line or to a milk pail. The single-lumen connecting hose line should not be longer than about 9 centimeters, and is used just as a connector to the common milk line or to the milk pail.

Figure 13:
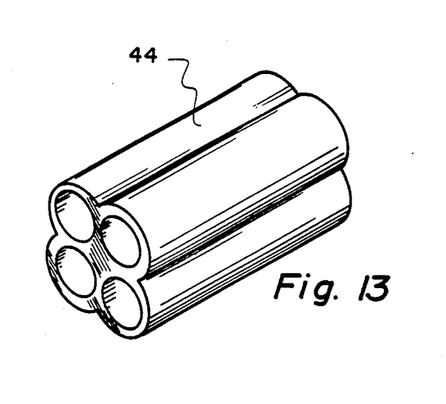
FIG. 13 is a pictorial view of the end portion of a 4-lumen hose line which can be advantageously used with the invention.

A pictorial view of the end portion of a 4-lumen hose 44 which is used in milking animals having 4 teats, such as cows, is shown in FIG. 13. The 4-lumen hose 44 is made of an extruded material, preferably silicone rubber. The centers of the 4 lumens are spaced equally so that the centers become the corners of a square when the hose is viewed in cross section.

Figure 9:
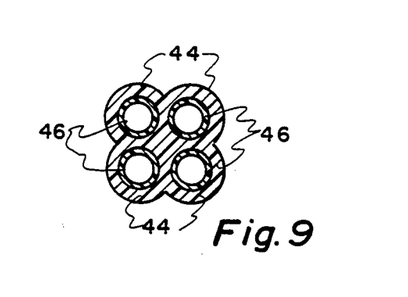
FIG. 9 is a cross-sectional view taken along line 9—9 of FIG. 6 additionally showing the connection of a 4-lumen hose line to the connector.
Figure 10:
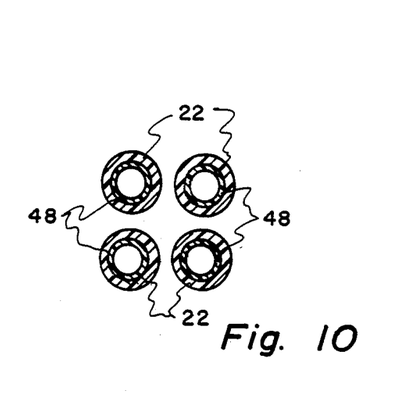
FIG. 10 is a cross-sectional view taken along line 10—10 of FIG. 6 additionally showing the four separate vacuum hose lines attached to the connector.

The 4-lumen hose is connected to the vacuum hose lines adjacent to but down stream from the clamp member 32 of the collector member by an adapter 45 shown in FIGS. 6-10. The adapter 45 comprises 4 cylindrical nipples 46 spaced in a square configuration so that the mutually respective nipples 46 of the adapter 45 are adapted to be received into the respective lumens of the 4-lumen hose 44 as shown in FIG. 9. The nipples 46 are united together and held in fixed position by an interconnecting web 47 which is molded integrally with the nipples 46. Four additional cylindrical nipples 48 are provided with each additional nipple 48 being connected in flow communication with a respective nipple 46. The additional nipples 48 are, however, spaced outwardly diagonally from the nipples 46 so that the nipples 48 are spaced apart from each other slightly further than are the nipples 46. This allows space for connection of the individual vacuum hose lines 22 to the respective nipples 48 as shown in FIG. 10. The entire adapter 45 is preferably molded as an integral unit from a rigid polymeric material.

Figure 11:
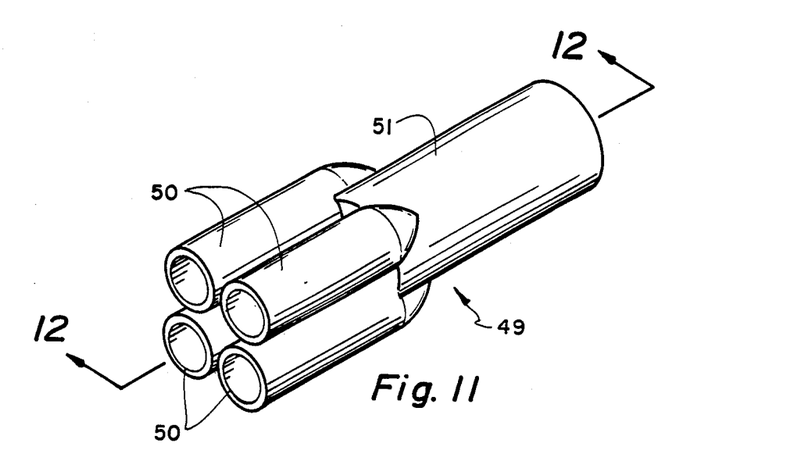
FIG. 11 is a pictorial view of the connector for attaching the multi-lumen hose to a single lumen hose.
Figure 12:
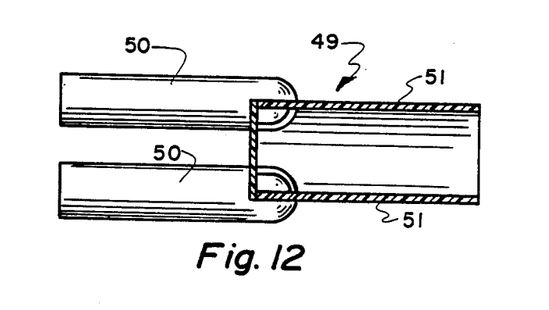
FIG. 12 is a cross-sectional view through the connector of FIG. 11 taken along line 12—12 of FIG. 11.

On the other end of the 4-lumen hose there is provided an adapter for merging the 4 lumens into a single lumen which is then connected to a common milk line or pipe or to a milk pail. The latter adapter 49 is shown in FIGS. 11 and 12. The adapter 49 comprises 4 cylindrical nipples 50 spaced in a square configuration so that the mutually respective nipples 50 of the adapter 49 are adapted to be received into the respective lumens of the 4-lumen hose 44 in a similar manner as the nipples 46 of the adapter 45. Mutually respective ends of the nipples 50 of adapter 49 are attached for flow communication to a common nipple 51. The nipples 50 are attached around the periphery of the common nipple 51, and the common nipple thus unites the nipples 50 together in a fixed position. The nipple 51 is adapted to be connected to a common milk pipe or milk pail either directly or through a short single-lumen connecting hose. When such a short, single-lumen connecting hose is used, its length should be no greater than about 9 centimeters. The end of the nipple 51 to which the nipples 50 are attached is otherwise closed so that flow from the nipples 50 must traverse through the nipple 51. The entire adapter 49 is preferably molded as an integral unit from a rigid polymeric material.

Figure 14:
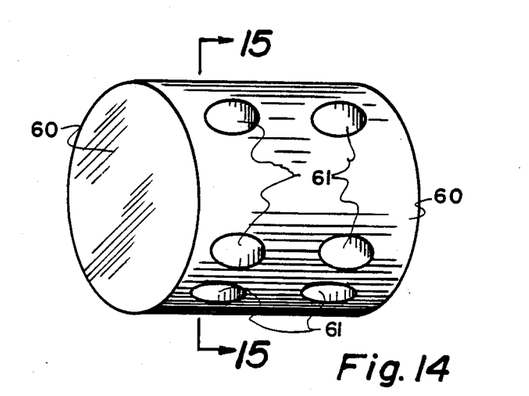
FIG. 14 is a pictorial view of a solid plug member having interconnecting passageways therein, wherein the solid plug is adapted to be received within the interior, cylindrical area of the collector member of FIG. 2.
Figure 15:
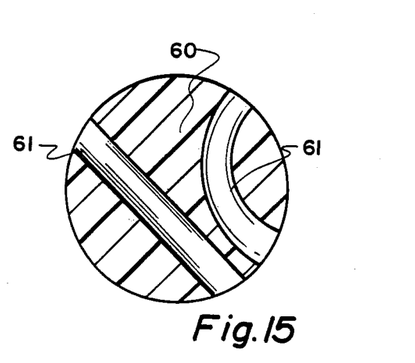
FIG. 15 is a cross section taken along line 15—15 of FIG. 14 showing one pair of interconnecting passageways in the solid plug member.

In a particularly preferred embodiment of the invention, the end plates on the cylindrical member 26a are replaced with a solid cylindrical insert member which is adapted to be inserted within the chamber formed by the cylindrical member 26a. The cylindrical plug member 60 is shown in FIGS. 14 and 15. Passageways 61 are bored or otherwise formed through the solid plug member 60 such that mutually respective openings in the plug member 60 align with corresponding openings in the cylindrical member 26a when the plug member 60 is properly inserted into the chamber formed by the cylindrical member 26a. The vacuum hose lines 22 from the teat cup assemblies are inserted through the corresponding passageways 61 in the plug member 60. The plug member 60 is advantageous in that there are no open cavities or chambers within the cylindrical member 26a to collect dirt, moisture or milk, and cleaning of the collector member is greatly simplified.

Figure 16:
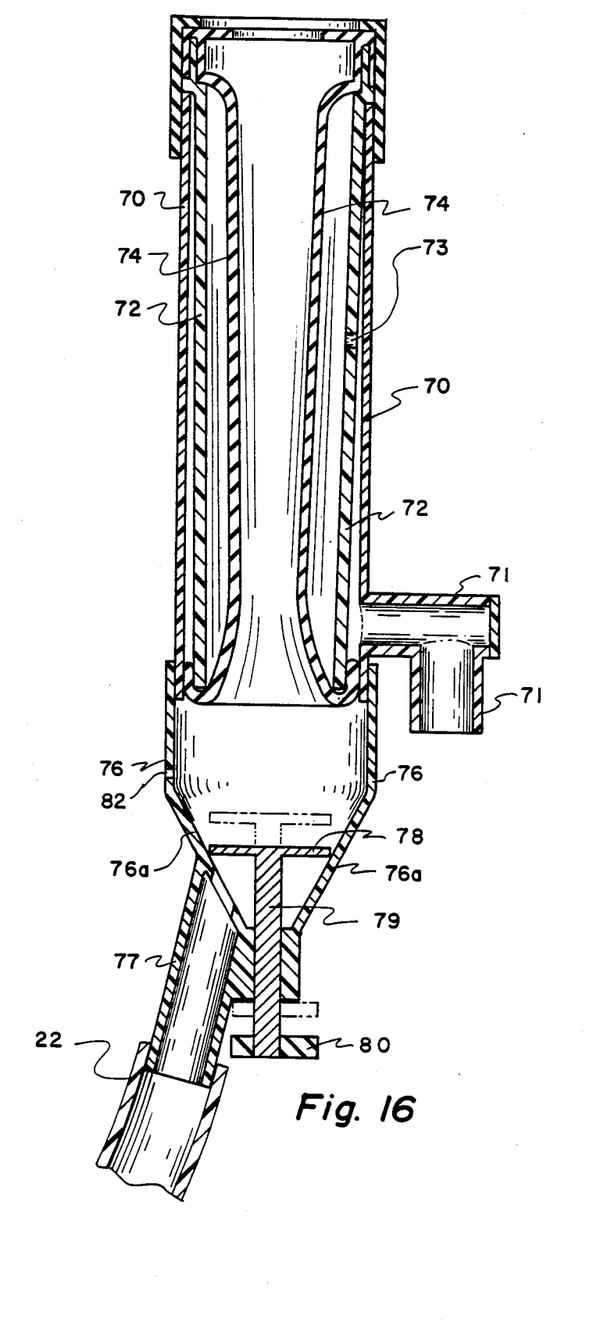
FIG. 16 is a vertical cross-section of a teat cup assembly which has incorporated therein a built in valving which is adapted to close the vacuum hose line connection to the teat cup whenever the teat cup falls from a teat of an animal which is being milked.

As mentioned previously, a novel teat cup assembly is advantageously provided for use with the collector member of the invention. The novel teat cup assembly contains a built in valve means which is automatically activated when the teat cup falls from the teat of an animal which is being milked. An embodiment of one such teat cup assembly is shown in FIG. 16. The teat cup assembly comprises a rigid, tubular, outer shell 70 having a port and nipple 71 therein which is adapted to be connected to a source of pulsating vacuum. A rigid inner shell 72 can be provided, however, as is well known in the art, the teat cup assembly may be of the type which does not utilize the rigid inner shell (see, for example, the teat cup assembly of U.S. Pat. No. 4,315,480 which does not utilize a rigid inner shell).

When an inner shell 72 is used as illustrated in FIG. 16, the top of the inner shell 72 and the top of the outer shell 70 are sealed together, and an opening 73 is provided in the sidewall of the inner shell 72. An elongate tubular inflation 74 made of a resilient, flexible, elastomeric material is received longitudinally within the rigid, inner shell 72. The upper end of the inflation 74 is sealed to the upper end of the rigid, inner shell 72, and the lower end of the inflation 74 is sealed between the lower end of the rigid, inner shell 72 and the rigid, outer shell 70. A pulsating vacuum chamber, as is well known in the art, is formed between the inflation 74 and the rigid, inner shell 72. The pulsating vacuum is transmitted from the nipple 71 in the outer shell through the opening 73 in the inner shell 72. When an inner shell is not being utilized, the inflation 74, as is well known, is sealed at its opposite ends to the outer shell 70, and the pulsating vacuum chamber is formed between the inflation 74 and the outer shell 70.

A collection chamber is formed beneath the lower end of the inflation 74, and the collection chamber is connected by the milk collecting tube 22 to a source of constant vacuum. The collecting chamber is formed by a cap member 76 which is attached to the bottom of the outer shell 70. The cap member 76 has a tapered or funnel-shaped section 76a, with a nipple 77 being attached to the lower portion of the funnel-shaped section 76a. The milk collecting tube 22 is connected to the nipple 77.

Novel valving means are associated with the collection chamber or cap member 76, with the valving means being adapted to close the vacuum from the collecting tube 22 from the inflation 74 whenever the teat cup assembly falls from the teat of the animal being milked. The valving mechanism comprises a disc 78 which is adapted to move up and down within the funnel-shaped portion 76a of the cap member 76. When the disc 78 is in its lowermost position, it seats about its perimeter around the inner circumference of the funnel-shaped portion 76a of the cap member 76. The disc 78 is adapted to seat just above the nipple 77, such that when the disc 78 is seated against the inner wall of the funnel-shaped portion 76a of the cap member 76, the vacuum from the hose 22 and nipple 77 is shut off from the remaining part of the teat cup assembly including the inflation 74.

Means are provided for restraining the movement of the disc to an up and down movement along the longitudinal center of the funnel-shaped portion 76a of the cap member 76. As illustrated, a plunger rod 79 is attached to the underside of the disc 78 and extends downwardly from the center of the disc 78. The plunger rod 79 is oriented so as to be substantially perpendicular to the disc 78. The plunger rod 79 passes through an opening in the bottom apex of the funnel-shaped portion 76a. The opening in the apex of the funnel-shaped portion 76a forms a journal-like bearing in which the plunger rod 79 is adapted to move back and forth in a longitudinal direction along the central axis of the cap member 76.

When a teat of an animal which is being milked is engaged in the teat entrance of the inflation 74, i.e., the open upper end of the inflation 74, the constant vacuum applied to the cap member 76 and thus the inflation 74 causes the plunger 79 and disc 78 to automatically move upwardly toward the inflation. Actually, the atmospheric pressure on the exposed lower end of the plunger 79 pushes the plunger 79 and disc 78 upwardly when the vacuum is drawn within the cap member 76 and inflation 74. When, for one reason or another, the teat cup assembly falls from the teat of the animal being milked, the plunger 79 and disc 78 automatically move downwardly until the disc 78 seats against the funnel-shaped sidewall of the cap member 76. The downward movement of the plunger 79 and disc 78 results from the atmospheric pressure in the inflation 74 when the teat of the animal no longer seals the inflation 74. The atmospheric pressure pushes the disc 78 downwardly against the vacuum which is being drawn on the lower side of the disc.

The seating of the disc 78 closes the nipple 77 from the atmosphere and stops the otherwise uninhibited flow of atmospheric air through the inflation 74 into the vacuum system of the milking apparatus. This prevents dirt from being sucked through the inflation 74 and into the milk system. Further, it greatly reduces the volumetric requirements of the vacuum system, such that the vacuum system can adequately maintain vacuum on any teat cup assembly which is still engaged on a teat of the animal being milked. Otherwise, the vacuum system must be greatly oversized volumetrically so that it can handle the uninhibited inflow of atmospheric air while still maintaining necessary vacuum on any teat cup assembly which is still engaged on a teat of the animal being milked.

Means for locking the plunger 79 and disc 78 in the open position is advantageously provided to aid the dairyman in cleaning the teat cup assemblies after use. By locking the disc 78 in the open position, cleaning fluids can be flushed through the teat cup assembly without any difficulty. This assures uniform cleaning of the teat cup assembly. As shown in FIG. 16, the locking means comprises an off-center disc 80 which is mounted to the protruding lower end of the plunger 79. The disc 80 is eccentrically mounted on the plunger 79, and to lock the disc 78 and plunger 79 in an open position, the plunger is moved upwardly, with the eccentric disc 80 being rotated so that the lobe on the eccentric disc 80 engages the nipple 77. This locks the plunger 79 and disc 78 in the open position. To release the plunger 79 and disc 78 for normal up and down movement, the eccentric disc 80 is rotated so that it no longer contacts the nipple 77.

It is also to be noted that it is advantageous to provide a small air bleed orifice on the teat cup assembly. As shown in FIG. 16, the small air bleed orifice is identified by the numeral 82. The air bleed orifice 82 is located on the sidewall of the cap member 76. The air bleed orifice 82 allows for a constant minimum flow of atmospheric air through the cap member 76, the nipple 77 and the milk tube 22. This air bleed prevents milk from backing up in the milk tube 22 due to variances in the pressures on associated teat cup assemblies.

Although a preferred embodiment of the apparatus has been illustrated and described, it is to be understood that the present disclosure is made by way of example and that various other embodiments are possible without departing from the subject matter coming within the scope of the following claims, which subject matter is regarded as the invention.

We claim:

1. A collector member for collecting or bringing together in substantially closely spaced arrangement the vacuum hose lines attached to individual milking cups of an automatic milking machine, said collector member comprising a cylindrical body member, said cylindrical body member having a sidewall which encloses a volume or space between the opposite ends of said cylindrical body member; a plurality of openings in the sidewall of the cylindrical body member, said openings being paired such that a plurality of vacuum hose lines may pass through mutually corresponding pairs of openings in said cylindrical body member, with each of the volume hose lines also passing through the space or volume enclosed by said cylindrical body member; a substantially flat member extending from the sidewall of said cylindrical body member; a common passage extending along said flat member through which all the individual, collected vacuum hose lines pass in substantially closely spaced side-by-side relationship.

2. A collector member as claimed in claim 1, wherein a releasable clamp means is mounted on the extending portion of said flat plate, said releasable clamp means being adapted to simultaneously compress the vacuum hose lines when the clamp means is activated and thus turn off the vacuum in the hose lines to all milking cups.

3. A collector member as claimed in claim 1, wherein end plates are attached to the otherwise open ends of the cylindrical member.

4. A collector member as claimed in claim 1, wherein a solid, cylindrical plug member is provided, said plug member being adapted to fit securely within the space or volume formed by the cylindrical member, said plug member further having a plurality of passages formed therein such that each passage communicates with a mutually respective pair of openings in said cylindrical member when the plug member is received within the space or volume formed by the cylindrical member, and whereby the vacuum hose lines pass through mutually respective passages in said plug member.

5. A collector member as claimed in claim 1, wherein the cylindrical body member is formed from an elongate piece of metal plate which is bent to a cylindrical shape.

6. A collector member as claimed in claim 1, further including in combination a multi-lumen milk hose and a connector member which is adapted to connect the collected, downstream ends of the vacuum hose lines to one end of said multi-lumen milk hose, with each vacuum hose line being connected to a respective lumen in said multi-lumen milk hose.

7. The combination as claimed in claim 5, wherein the multi-lumen hose has a minimum length of one meter, and the other end of said multi-lumen milk hose is adapted to be connected to a common milk line or to a milk pail.

8. The combination as claimed in claim 6, wherein the multi-lumen hose has a minimum length of one meter, and said combination further includes a single lumen milk line and an adapter which is adapted to connect one end of the single lumen milk line to the other end of said multi-lumen milk hose, wherein the single lumen milk is no longer than about nine centimeters and is adapted to be connected at its other end to a common milk line or to a milk pail.

9. A collector member as claimed in claim 1 in which each of the vacuum hose lines is connected to a milking cup which is provided with automatic valving means, wherein the valving means is adapted to turn the vacuum off from the milking cup whenever the milking cup falls from the teat of an animal which is being milked.

10. A collector member as claimed in claim 9, wherein each of the milking cups is further provided with a small air bleed orifice through which a controlled amount of atmospheric air is metered to the milking cup when the milking cup is engaged on a teat of an animal which is being milked.

* * * * *